Figure 1:
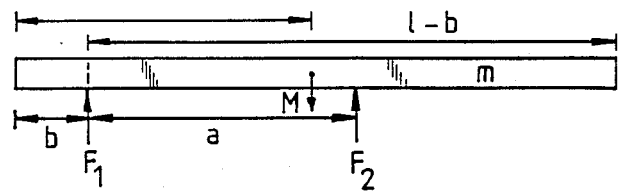

United States Patent [19]

Turtinen et al.

[11] Patent Number: 4,981,185
[45] Date of Patent: Jan. 1, 1991

[54] METHOD AND A DEVICE FOR MEASURING THE DIMENSIONS OF ELONGATED AND/OR PLANAR OBJECTS

[75] Inventors: Matti T. Turtinen, Jakkukylä; Esko L. I. Alasaarela, Jokirinne, both of Finland

[73] Assignee: Justing Electronics OY, Oulu, Finland

[21] Appl. No.: 460,868
[22] PCT Filed: Aug. 11, 1988
[86] PCT No.: PCT/FI88/00128
§ 371 Date: Feb. 14, 1989
§ 102(e) Date: Feb. 14, 1989
[87] PCT Pub. No.: WO89/01610
PCT Pub. Date: Feb. 23, 1989

[30] Foreign Application Priority Data

Aug. 21, 1987 [FI] Finland .................................. 873629

[51] Int. Cl.$^5$ .......................... G01G 19/40; G01B 5/00
[52] U.S. Cl. .................................. 177/25.14; 364/567; 33/833
[58] Field of Search .................. 177/25.14; 364/567; 33/833

[56] References Cited

U.S. PATENT DOCUMENTS

| | | | |
|---|---|---|---|
| 3,175,438 | 3/1965 | Johnson | 177/25.14 |
| 3,216,515 | 11/1965 | Roberts | 177/25.14 |
| 4,667,757 | 5/1987 | Johnson | 177/25.11 |
| 4,785,550 | 11/1988 | Wilkins | 33/833 X |

*Primary Examiner*—George H. Miller, Jr.
*Attorney, Agent, or Firm*—Ladas & Parry

[57] ABSTRACT

A measuring device for determining the longitudinal dimensions of elongated and/or planar objects, such as boards and planks or plates, the device comprising a horizontal measuring platform (1) comprising at least at one predetermined point a stopper (2) against which one side or end of the object to be measured is positioned, the measuring platform (1) being supported by means of weighing sensors (4a, 4b, 5) from below at least at two points (4, 5) which are positioned at a predetermined distance from each other and at predetermined distances from said stopper (2), whereby the weighing sensors are connected to an electronical calculation unit to which output signals from the weighing sensors (4a, 4b, 5) are applied and which calculates the length of the object on the basis of the ratio of the output signals from the weighing sensors. According to the invention, the device comprises two weighing sensors (4a, 4b) which are both positioned at a predetermined distance (b) from the stopper (2) apart from each other, and at least one weighing sensor (5) which is positioned at a predetermined distance from a line going through said two sensors (4a, 4b).

7 Claims, 1 Drawing Sheet

METHOD AND A DEVICE FOR MEASURING THE DIMENSIONS OF ELONGATED AND/OR PLANAR OBJECTS

The invention relates to a method according to the preamble of claim 1 and to a device according to the preamble of claim 5 for the determination of the longitudinal dimensions of elongated and/or planar objects, such as boards and planks.

When handling various kinds of long objects, it is often also necessary to measure the length of the objects. With the exception of handling associated with automated production lines and certain machines, the measuring must usually be carried out manually with a traditional measure.

Boards and planks are typical examples of bulk goods the handling of which requires a great number of longitudinal measurings to be carried out. In timber yards, for instance, a great number of individual boards and planks have to be measured daily, which occupies labour and takes plenty of time. The need to speed up and/or automate measuring is thus obvious. In addition, the board goods to be measured are usually positioned at several places within a large area, so that it would be preferable to measure the board goods where they are positioned. In practice, this requires a light and easily displaceable measuring device.

One way of measuring length is disclosed in British Patent Specification No. 1 375 964, in which the length of short metal rods is measured by means of a measuring table supported on two supports by determining the loads exerted on the supports by a rod positioned on the measuring table, and by calculating the length of the rod on the basis of these loads. In the method, the distance between the supports has to be constant, and the length of the object to be measured has to be shorter than this distance (see e.g. page 1, lines 86 to 93 and page 2, lines 103 to 112). This implies that the length of the object to be measured must not exceed the length of the measuring table, so that the measuring of long boards, for instance, requires a very long, impractical measuring device which takes a lot of room.

Another method of measuring length is disclosed in British Patent Specification No. 1 065 021 and U.S. Pat. No. 3,175,438. Also in this case the metal rod to be measured is weighed at two points whereas the length of the object to be measured is not restricted to the length of the measuring platform. The device disclosed in U.S. Pat. No. 3,175,438 is, however, intended for cutting heavy metal rods, and the structure of the device is not suitable for an easily displaceable, light device for longitudinal measuring of objects such as long board goods.

The object of the present invention is to provide a method of measuring length which is suited for a rapid accurate and easy length measuring of objects of various lengths and in which the measuring range is not restricted by the length of the measuring device but covers all lengths needed in practice.

A further object of the invention is to provide a measuring device, preferably displaceable, for carrying out the method.

Still another object of the invention is to provide a method and a device which are suited for measuring the longitudinal and lateral dimensions of planar objects.

This is achieved by means of a method according to claim 1, which is characterized in that the object to be measured is weighed at least at three points out of which two are positioned apart from each other at a first distance from the stopper and the third is positioned at a second distance from a line going through said two weighing points, and that in the length measuring said first weighing result is formed by combining the weighing results from said two first-mentioned weighing points.

The length of the object to be measured can thus be calculated directly by means of the two distance measurements and the ratio of the weighing results obtained from the two points. The length of the object is not restricted to the distance between the supports nor to the length of the measuring platform. Since the length can be calculated on the basis of the ratio of the weighing results only, the method can be used, for example, for measuring objects of various types one by one consecutively without any changes, the only precondition being that the weight of the object to be measured per length unit should be sufficiently constant.

Multi-point weighing provides accurate measuring insensitive to the position of the object on the measuring platform.

The multi-point weighing according to the invention also enables the measuring of the dimensions of substantially rectangular plates, i.e. a two-dimensional measuring. Each dimension to be measured is thereby calculated by means of the ratio of two weighing results obtained in the direction of the dimension to be measured. The two weighing sensors and the one separate weighing sensor form a kind of three-point support which provides a better support for the measuring platform and increases the loadability of the measuring device.

For steadily supporting the measuring platform, a further fourth sensor may be used in the measuring of plates, whereby the third and the forth sensor are apart from each other and at an equal distance from a line going through the first pair of sensors. Thereby both the dimensions to be measured are preferably determined by means of the two ratios formed separately by the two pairs of sensors.

The measuring accuracy depends on the sensitivity of the weighing sensors, which is preferably a few grams. The sensors are tared before each measuring. Continual taring also eliminates errors caused by snow, ice, rubbish, etc., gathering on the measuring platform in outdoor use. Since the sensors used are similar, the possible creeping of the sensors also takes place in the same direction, and the measuring error caused thereby is compensated.

The method also enables the bundling of boards, for instance, directly onto the measuring table when the boards are gathered into a bundle and measured one by one, and the sensors are tared before a new board is added. By automating the process it is, for instance, possible to realize a self-service board goods measuring station which measures timber while it is piled on the platform. At the same time the measuring platform can serve as a bundle tying station, wherefrom the bundle is taken out by means of a forklift.

The invention is also concerned with a measuring device according to claim 5, in which the method according to the invention is applied.

The weighing sensors are preferably mounted on a light frame provided with wheels so as to obtain a displaceable measuring device easy to handle.

Figure 2:
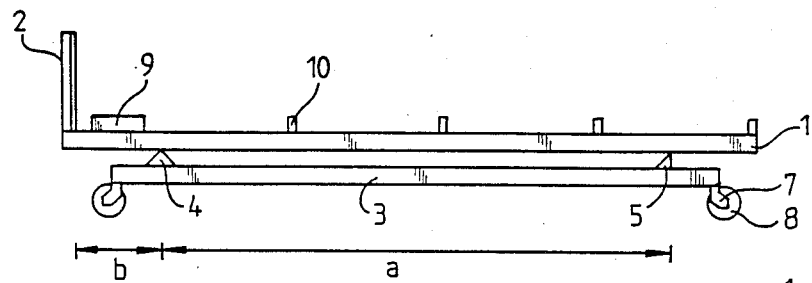
Figure 3:
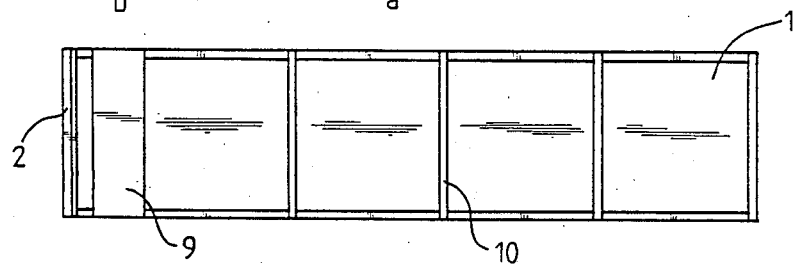
Figure 4:
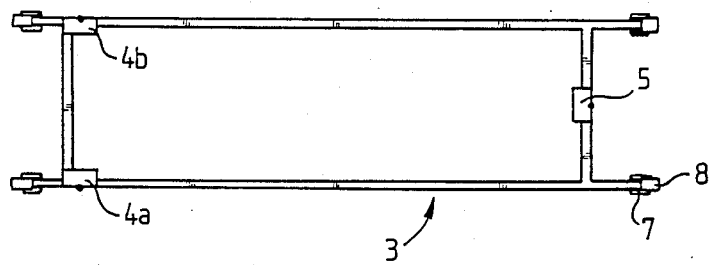
Figure 5:
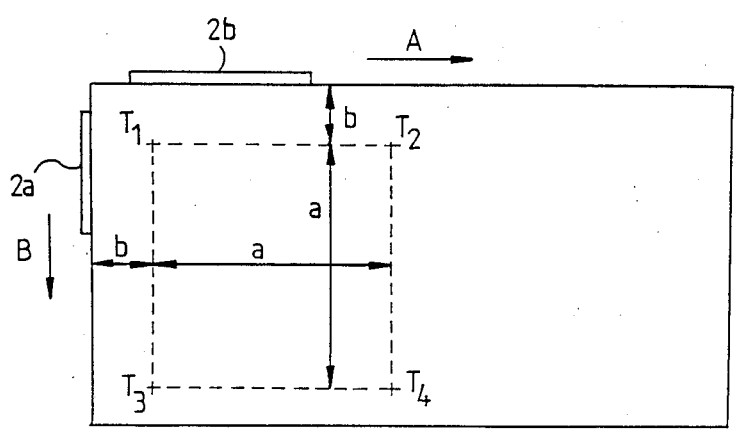

The present invention will be described in the following in more detail with reference to the attached drawing, wherein FIG. 1 illustrates the theoretical aspect of the method according to the invention, FIG. 2 is a side view of a measuring device according to a preferred embodiment of the invention, FIG. 3 is a top view of the device of FIG. 2, FIG. 4 is a top view of the device of FIG. 2 when the measuring platform has been detached, FIG. 5 illustrates another measuring device according to the invention.

To begin with, the theory of the length determination according to the present method will be described with reference to FIG. 1 and the mathematical formula used in the method will be proved.

FIG. 1 shows an elongated beam which has the length 1 and the mass of which is assumed to be evenly distributed, i.e. the mass per length unit is constant.

The beam is positioned horizontally on two supports, whereby the first support is positioned at a predetermined distance b from one end of the beam and the second at a predetermined distance a from the first support in a direction towards the other end of the beam.

At its centre of gravity, the beam exerts a force M downwards, whereby the first support exerts an upward force $F_1$ and the second support an upward force $F_2$. The sum of the forces is thereby $$\Sigma F = F_1 + F_2 - M = 0 \qquad (1)$$

wherein $M = m \cdot g$, m is the mass of the beam and g is the acceleration of the force of gravity.

Torque at the first support point ($F_1$) is $$\Sigma M_1 = \frac{1-b}{2} \cdot \frac{1-b}{1} \cdot M - \frac{b}{2} \cdot \frac{b}{1} \cdot M - a \cdot F_2 = 0 \qquad (2)$$

which gives $$\left(\frac{1}{2} - b\right)M - aF_2 = 0 \qquad (3)$$

Formula (1) can also be presented in the form $$F_1 + F_2 = M \qquad (4)$$

and formula (3) in the form $$\left(\frac{1}{2} - b\right)M = a \cdot F_2 \qquad (5)$$

Formulae (4) and (5) in combination give $$1 = \frac{2a \cdot F_2}{M} + 2b = \frac{2a \cdot F_2}{F_1 + F_2} + 2b \qquad (6)$$

which gives the final form $$1 = \frac{2a}{1 + \frac{F_1}{F_2}} + 2b \qquad (7)$$

The length of a beam can thus be determined by means of formula (7), provided that the ratio $F_1/F_2$ is known.

On the other hand, the forces $F_1$ and $F_2$ correspond to the distribution of the weight of the beam to the first and the second support point, and they are obtained simply by means of the weight sensors positioned at these support points.

The length of the beam may exceed the distance a. For instance, when $F_1 = 0$, the centre of gravity of the beam, i.e. the centre thereof, is positioned at $F_2$, whereby formula (7) gives $$1 = \frac{2a}{1 + 0/F_2} + 2b = 2a + 2b$$

This is also the maximum length to be measured by means of the arrangement of FIG. 1, since the centre of gravity of the beam must not be beyond the point $F_2$. However, if a long measuring platform is positioned on these two supports, and the beam is measured thereon, the centre of gravity of the beam may be beyond the point $F_2$. The minimum length that can be measured is not restricted.

FIG. 2 shows a displaceable measuring device suited for uni- or two-dimensional measuring, comprising a horizontal measuring platform 1. At one end of the measuring platform is positioned a vertical stopper plate 2, whereby the end of a board to be positioned on the measuring platform 1 is pushed against the abutting surface of the stopper plate. In addition, the upper surface of the measuring platform 1 is further provided with uniformly spaced beams 9 and 10 transverse in the longitudinal direction of the platform. These beams keep the boards out of contact with the upper surface of the measuring platform so that the bundle of boards can be lifted off the measuring platform onto a forklift.

The measuring platform 1 is supported from below by means of two supports 4 and 5, whereby the support 4 is positioned at a distance b from the abutting surface of the stopper plate and the support 5 at a distance a from the support 4. The supports 4 and 5, in turn, are fastened to a frame structure 3 which is provided with wheels 8. The frame structure 3 is preferably formed by a framework of tubes, as shown in FIG. 4, so that the measuring device becomes light and easily displaceable.

It appears from FIG. 4 how the supports are preferably formed by three weighing sensors 4a, 4b and 5. The sensors 4a and 4b are positioned on both sides of the frame structure 3 at the distance b from the abutting surface of the stopper plate 2. The sensor 5 is positioned substantially on the central line of the frame structure 3 at the distance a from a line going through the sensors 4a and 4b. Such a three-point solution provides a steady support for the measuring platform with a minimum number of weighing sensors. There may be more sensors as well, but this increases costs.

The length of an object positioned on the platform 1 (longitudinally of the platform 1) is calculated by means of the ratio of the sum or the average of the weighing results from the sensors 4a and 4b and the weighing result from the sensor 5. Correspondingly, the width of an object positioned on the platform 1 (in the direction of the width of the platform) is calculated e.g. by means of the ratio of the weighing result from the sensors 4a and 4b when the mutual distance of the sensors as well as the distance from one edge of the object to be measured are known. For two-dimensional measuring, the platform 1 is preferably provided with another stopper against which one long side of the object can be positioned.

The weighing sensors may be suitable power sensors producing an electrical output, for instance. The sensor system and the support of the measuring platform may well be arranged otherwise than described herein.

The measuring device may, of course, comprise an electronic control unit, such as a microprocessor, to carry out the necessary calculations, store measuring results, control the possible display, keyboard, etc. This kind of control unit can be connected to an external computer or network for transferring measuring results for the use of a larger system, such as a programme for the control of invoicing and storage. On the basis of the method described above, such a control unit can be realized in a manner obvious to one skilled in the art. Since the measuring device also detects the mass of the object (see formula 1), the control unit can be supplied with information which identifies the type of the product to be measured and, e.g., automatically prices the piece or the lot of goods to be measured.

Furthermore, the measuring platform 1 is preferably provided with water levels, whereby it can be positioned horizontally by means of suitable adjusting means. Such adjusting means may, e.g., be arranged to adjust the height of the wheels 8 at one end.

The application of the method according to the invention to measuring two or more dimensions of an object is illustrated in FIG. 5. This kind of measuring is based on the principle that formula (7) and unidimensional measuring are applied separately in each direction to be measured.

FIG. 5 illustrates the measuring of the sides of a substantially rectangular plate. The plate to be measured is positioned on the measuring table against two stoppers 2a and 2b perpendicular to each other. The measuring platform is supported at least at three points $T_1$, $T_2$, and $T_3$. The length of the plate in the direction A is determined as described above by means of the weighing results obtained from the points $T_1$ and $T_2$. The length of the plate in the direction B is correspondingly determined by means of the weighing results obtained from the points $T_1$ and $T_2$. For making the measuring table more steady, an additional forth support $T_4$ is used in FIG. 5. Thereby the length of the plate e.g. in the direction A can be determined by means of the weighing results obtained from the points $T_1$ and $T_2$ and/or $T_3$ and $T_4$. It is assumed in FIG. 5 that the distances a and b are the same in both measuring directions. This, however, is not necessary.

The figures and the description related thereto are only intended to illustrate the invention. In its details, the method and the device according to the invention may vary within the scope of the attached claims.

We claim:

1. A method of determining the longitudinal dimensions of elongated and/or planar objects, such as boards and planks or plates, by means of a measuring platform (1), at least one side of said measuring platform being provided with a stopper (2, 2a, 2b) at a predetermined point, whereby the measuring platform is supported from below by at least two supports (4, 5, $T_1$–$T_4$), the first support (4) being positioned at a first predetermined distance (b) from the stopper (2) towards the opposite side of the measuring platform (1), and the second support (5) at a second predetermined distance (a) from the first support (4) towards said opposite side of the measuring platform, wherein the object to be measured is positioned on the measuring platform (1) with one side against the stopper, and the object to be measured is weighed at said at least first (4) and second (5) support for obtaining a first and a second weighing result, respectively, indicating the distribution of the weight of the object on to the supports, and wherein the length of the object to be measured in a direction perpendicular to the side positioned against the stopper is determined on the basis of the ratio of said weighing results, characterized in that the object is weighed at least at three points, whereof two are positioned apart from each other at said first distance from the stopper (2) and the third is positioned at said second distance from a line going through said two weighing points, and that in the length measuring said first weighing result is formed by combining the weighing results of said two first-mentioned weighing points.

2. A method according to claim 1, characterized in that the length of the object is measured in two directions perpendicular to each other, whereby length in the first direction is determined by means of weighing results obtained at the two supports ($T_1$, $T_2$) positioned one after another in said first direction at predetermined points, and length in the second direction is determined correspondingly by means of weighing results obtained at two supports ($T_1$, $T_3$) positioned one after another in said second direction at predetermined points, the distance (a) between the supports ($T_1$, $T_2$ or $T_1$, $T_3$) as well as the distance of the first support ($T_1$) from that side of the object which is positioned against the respective stopper (2a or 2b) perpendicularly to the measuring direction being known in both cases.

3. A method according to claim 1 characterized in that the weighing sensors carrying out the weighing are tared before the object to be measured is positioned in place.

4. A method according to claim 1, characterized in that the objects to be measured are piled into a bundle on the measuring platform (1) so that the objects are added to the bundle and their length is measured consecutively one by one, the taring of the weighing sensors being carried out after each measuring before a new object is added.

5. A measuring device for determining the longitudinal dimensions of elongated and/or planar objects, such as boards and planks or plates, the device comprising a horizontal measuring platform (1) comprising at least at one predetermined point a stopper (2) against which one side or end of the object to be measured is positioned, the measuring platform (1) being supported by means of weighing sensors (4a, 4b, 5) from below at least at two points (4, 5) which are positioned at a predetermined distance from each other and at predetermined distances from said stopper (2), whereby the weighing sensors are connected to an electronical calculation unit to which output signals from the weighing sensors (4a, 4b, 5) are applied and which calculates the length of the object on the basis of the ratio of the output signals of the weighing sensors, characterized in that the device comprises two weighing sensors (4a, 4b) which are both positioned at a predetermined distance (b) from the stopper (2) and apart from each other, and at least one weighing sensor (5) which is positioned at a predetermined distance from a line going through said two sensors (4a, 4b).

6. A device according to claim 5, characterized in that the measuring platform comprises a first stopper (2b) at one side and a second stopper (2b) at an adjacent side perpendicular thereto, and that the measuring platform comprises at least four weighing sensors, the first sensor ($T_1$) being positioned at a first distance (b) from both stoppers (2a, 2b), the second sensor ($T_2$) at a first distance (b) from the first stopper (2b) and at a second distance from the first weighing sensor ($T_1$), the third sensor ($T_3$) at the first distance (b) from the second stopper (2a) and at the second distance (a) from the first weighing sensor ($T_1$) and the forth sensor ($T_4$) at the second distance (a) both from the second ($T_2$) and the third ($T_3$) weighing sensor.

7. A device according to claim 6, characterized in that the weighing sensors (4a, 4b, 5) are mounted on a frame (3) provided with wheels (8), and that the measuring platform (1) is provided with water levels and is adjustable so that it can be positioned accurately horizontally.

* * * * *

UNITED STATES PATENT AND TRADEMARK OFFICE
CERTIFICATE OF CORRECTION

PATENT NO. : 4,981,185
DATED      : January 1, 1991
INVENTOR(S): Matti T. Turtinen; Esko L.I. Alasaarela It is certified that error appears in the above-identified patent and that said Letters Patent is hereby corrected as shown below:

Title Page, Item [86], § 371

Date: Please change "1989" to -- 1990 --

Title Page, Item [86], § 102(e)

Date: Please change "1989" to -- 1990 --

Signed and Sealed this

First Day of February, 1994

*Attest:*

BRUCE LEHMAN

*Attesting Officer*       *Commissioner of Patents and Trademarks*